(12) United States Patent
Hehenberger

(10) Patent No.: US 10,378,617 B2
(45) Date of Patent: Aug. 13, 2019

(54) METHOD FOR OPERATING A DRIVE TRAIN, AND DRIVE TRAIN

(71) Applicant: Gerald Hehenberger, Klagenfurt (AT)

(72) Inventor: Gerald Hehenberger, Klagenfurt (AT)

( * ) Notice: Subject to any disclaimer, the term of this patent is extended or adjusted under 35 U.S.C. 154(b) by 275 days.

(21) Appl. No.: 14/785,802

(22) PCT Filed: May 19, 2014

(86) PCT No.: PCT/AT2014/000113
§ 371 (c)(1),
(2) Date: Oct. 20, 2015

(87) PCT Pub. No.: WO2014/183142
PCT Pub. Date: Nov. 20, 2014

(65) Prior Publication Data
US 2016/0076630 A1 Mar. 17, 2016

(30) Foreign Application Priority Data

May 17, 2013 (AT) ..................................... 419/2013

(51) Int. Cl.
*F16H 3/72* (2006.01)
*F03D 15/10* (2016.01)
(Continued)

(52) U.S. Cl.
CPC ........... *F16H 3/724* (2013.01); *F03D 7/0276* (2013.01); *F03D 9/255* (2017.02); *F03D 15/00* (2016.05);
(Continued)

(58) Field of Classification Search
CPC .. F16H 3/724; F16H 3/727; F16H 2061/6602; F16H 2061/6604; F16H 15/50;
(Continued)

(56) References Cited

U.S. PATENT DOCUMENTS

| 2,346,979 | A | * | 4/1944 | Lilley | ..................... | B64C 11/36 |
| | | | | | | 416/146 R |
| 2006/0205553 | A1 | * | 9/2006 | Lee | ......................... | F16H 3/727 |
| | | | | | | 475/5 |

(Continued)

FOREIGN PATENT DOCUMENTS

| AT | 507 394 A2 | 4/2010 |
| CN | 101265961 | 9/2008 |

(Continued)

OTHER PUBLICATIONS

China Office Action dated Mar. 3, 2017; Application No. 201480028608.3.

(Continued)

*Primary Examiner* — Stacey A Fluhart
(74) *Attorney, Agent, or Firm* — Young & Thompson

(57) ABSTRACT

Disclosed is a method for operating a drive train having a drive shaft (2), an electric prime mover (4) connected to an electrical grid (12), and a differential gearing (3) having a total of three input and output elements, an output element being connected to the drive shaft (2), one input element to the prime mover (4) and a second input element to a differential drive (5). According to said method the differential drive (5) is motor-operated only, whereas the prime mover (4) is motor- or generator-operated, the differential drive (5) being coupled to the electrical grid (12) by way of a rectifier (19).

10 Claims, 13 Drawing Sheets

(51) Int. Cl.
*F03D 9/25* (2016.01)
*F03D 7/02* (2006.01)
*F03D 15/00* (2016.01)

(52) U.S. Cl.
CPC .... *F03D 15/10* (2016.05); *F05B 2260/40311* (2013.01); *Y02E 10/722* (2013.01); *Y02E 10/723* (2013.01)

(58) Field of Classification Search
CPC ............. F16H 2061/005; Y02E 10/723; F05B 2260/40311
See application file for complete search history.

(56) References Cited

U.S. PATENT DOCUMENTS

| | | | | |
|---|---|---|---|---|
| 2009/0312145 | A1* | 12/2009 | Pohl | F02B 67/04 477/37 |
| 2010/0207396 | A1* | 8/2010 | Simon | H02P 9/06 290/55 |
| 2011/0206517 | A1* | 8/2011 | Antonov | F16H 3/724 416/170 R |
| 2011/0229324 | A1 | 9/2011 | Hehenberger | |
| 2012/0115661 | A1 | 5/2012 | Hehenberger | |
| 2012/0126628 | A1* | 5/2012 | Bjerknes | F03D 7/0224 307/84 |

FOREIGN PATENT DOCUMENTS

| | | |
|---|---|---|
| DE | 20 2012 101 708 U1 | 6/2012 |
| GB | 2 225 616 A | 6/1990 |
| WO | 2006/100528 A1 | 9/2006 |
| WO | 2010/101467 A1 | 9/2010 |
| WO | 2011/000008 A1 | 1/2011 |
| WO | 2013/020148 A2 | 2/2013 |

OTHER PUBLICATIONS

International Search Report, dated Oct. 14, 2014, from corresponding PCT Application.
Austrian Search Report, dated Jul. 13, 2015, from corresponding Austrian Application.

\* cited by examiner

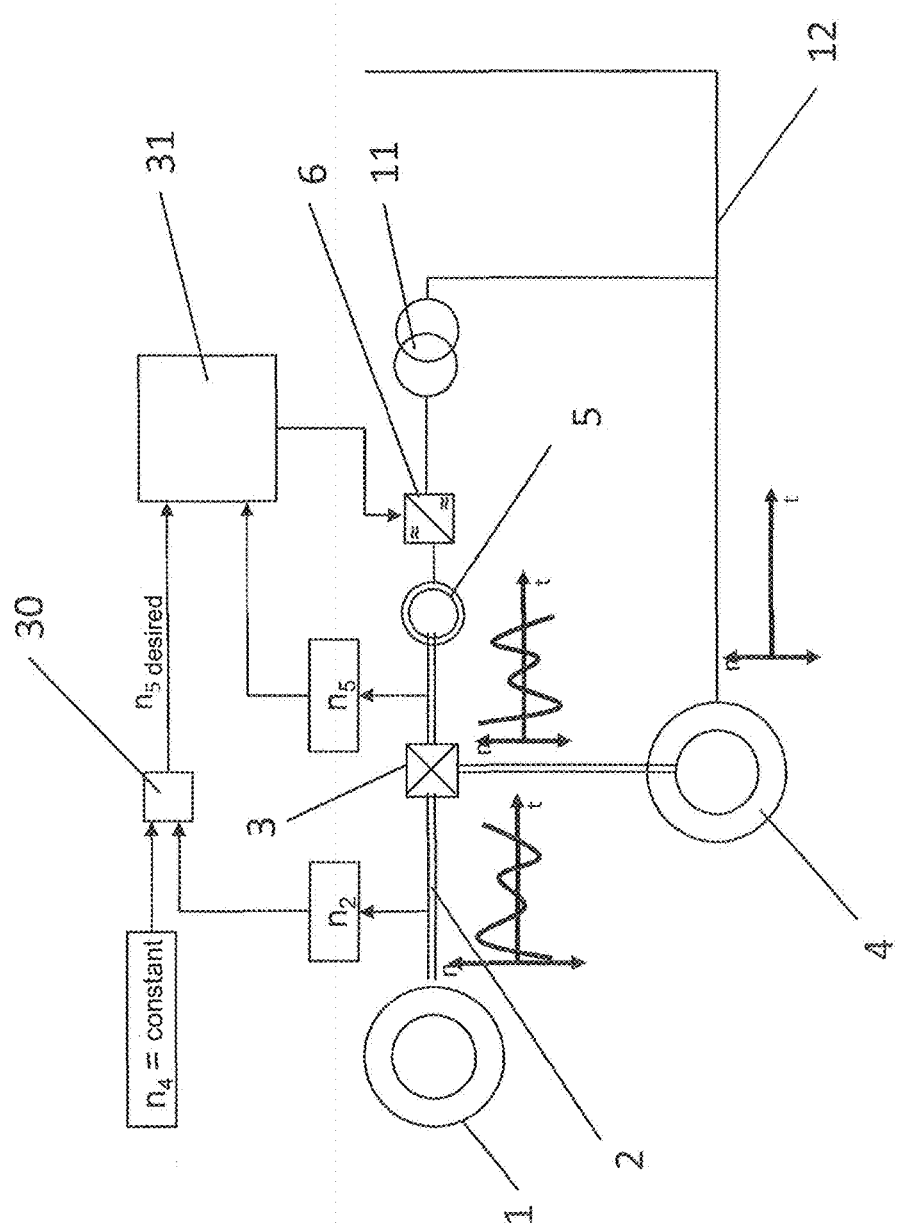

METHOD FOR OPERATING A DRIVE TRAIN, AND DRIVE TRAIN

BACKGROUND OF THE INVENTION

Field of the Invention

The invention relates to a method for operating a drive train with a drive shaft, an electrical prime mover that is connected to a power grid, and with a differential gear system with three inputs and outputs, one output being connected to the drive shaft, one input being connected to the prime mover, and a second input being connected to a differential drive.

The invention relates, furthermore, to a drive train with a drive shaft, an electrical prime mover that is connected to a power grid, and with a differential gear system with three inputs and outputs, one output being connected to the drive shaft, one input being connected to the prime mover, and a second input being connected to an electrical differential drive.

Description of the Related Art

One general problem of driven machines such as delivery systems, for example pumps, compressors and fans, or such as mills, crushers, vehicles, etc., is efficient variable-speed operation. Hereinafter, electrical machines are used as the example for prime movers, but the principle applies to all possible types of prime movers, such as, for example, internal combustion engines. The most frequently used electrical drives are currently three-phase machines, such as, for example, asynchronous motors and synchronous motors.

BRIEF SUMMARY OF THE INVENTION

The object of the invention is to devise a method and a device of the initially-mentioned type in which the delivery rate of the delivery system can be changed in a simple construction.

This object is achieved in a method of the initially-mentioned type in that the differential drive is only motor-operated, while the prime mover is motor-operated.

This object is furthermore achieved with a drive train of the initially-mentioned type in that the differential drive is connected to the power grid via a rectifier.

The heart of the differential system is a differential gear system that in one simple execution is a simple planetary gear stage with three inputs and outputs, one output being connected to the drive shaft of a driven machine, a first input being connected to the prime mover, and a second input being connected to a differential drive. Thus, the driven machine can be operated in a variable-speed manner at constant speed of the prime mover by the differential drive equalizing the speed difference.

With the differential drive, the quantity delivered by the driven machine can be increased by the constant power of the prime mover being increased by the variable power of the differential drive.

If the inverter that is conventionally used for an electrical differential drive is replaced by a rectifier 19, this is advantageous since the latter generally has a higher efficiency than the inverter and is also much more durable and economical.

If the differential drive is only motor-operated while the prime mover is motor- or generator-operated, the method according to the invention and the drive train according to the invention can be used very effectively for pump turbines that are used in, for example, storage power plants.

Preferred embodiments of the invention are the subject matter of the dependent claims.

BRIEF DESCRIPTION OF THE DRAWINGS

Preferred embodiments of the invention are explained below with reference to the attached drawings. Here:

FIG. 13 shows a control system for damping drive train vibrations.

DETAILED DESCRIPTION OF THE PREFERRED EMBODIMENTS

Figure 1:
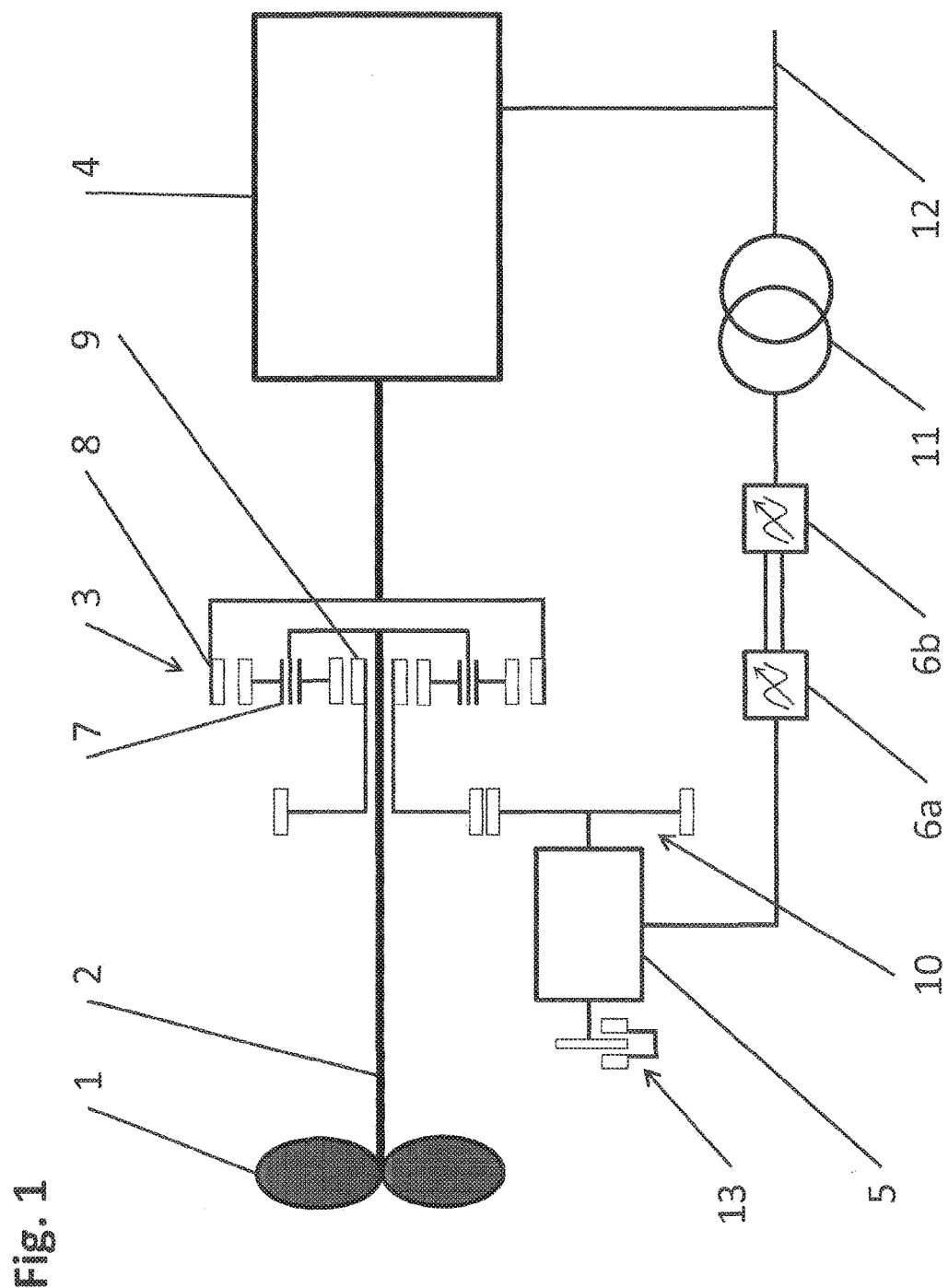
FIG. 1 shows the principle of a differential system for one input of a pump.

In spite of high electrical power consumption, three-phase machines at rest are not able to deliver this power fully mechanically; this is reflected in high losses and a lower starting torque. At the same time, the current consumption of a three-phase machine when starting from speed zero corresponds typically to roughly 7 times the rated current; this causes a correspondingly high electrical load for the grid during starting.

Therefore, a three-phase machine must be designed to be correspondingly large so that it can deliver an input torque that corresponds to the rated torque from rest and is for this reason often overdimensioned. For this reason, electrical machines are therefore also often executed in combination with a frequency converter as a variable-speed input instead of being connected directly to a grid. Thus, starting with high torque from speed zero can be implemented without loading the grid; the approach is, however, expensive and associated with major losses of efficiency. One alternative that is more cost-favorable and also better with respect to efficiency compared to this is the use of differential systems—for example according to AT 507 394. The fundamental limitation here, however, is that depending on the transmission ratio of the differential stage, only a relatively small speed range or in the so-called differential mode essentially no low speeds can be achieved on the drive shaft of a driven machine.

There are various possibilities for doing this. According to German Utility Model No. 20 2012 101 708.3, for example, the transmission ratio of the differential gear system can be fixed at 1. On this basis, the complete drive train can be driven with the differential drive or the prime mover can be brought to synchronous speed, and it can subsequently synchronize with the grid.

The disadvantage of this approach is that the differential drive or its frequency converter is dimensioned to be much smaller than the prime mover and therefore can also only deliver a correspondingly small torque.

In order to synchronize a prime mover under load either with the grid (such as, for example, electrical machines that are coupled directly to the grid) or to accelerate it into a speed range with high available torque (such as in, for example, internal combustion engines) and in addition to be able to start the driven machine with maximum or design torque of the drive train away from speed zero and preferably to bring it to synchronous speed, the starting can take place, for example, as follows in 3 phases:

Phase 1: The prime mover is preferably switched to the grid using a so-called star/delta connection or alternatively (in an especially grid-friendly method) first using an additional system, it is brought to (at least roughly) synchronous speed and then synchronized with the grid. In the case of an internal combustion engine, it is simply started and then accelerated. In doing so, the prime mover remains largely free of external mechanical loads during starting, aside from the reaction forces of the second input of the differential gear system, which forces are caused by the mass moment of inertia and must be overcome. By implication, this means that until the prime mover has reached its rated speed, a correspondingly small driving torque acts on the drive shaft of the driven machine.

Phase 2: Since the full torque of the prime mover is now available, in the second phase the actual acceleration and starting of the driven machine begin under load by the second input of the differential gear stage being decelerated by means of a synchronization brake.

Phase 3: As soon as the drive shaft of the second input of the differential system is in the control speed range of the differential drive, the latter takes over the speed control of the drive train and the synchronization brake is released.

FIG. 1 shows the principle of a differential system for a drive train in the example of a pump. Here, the driven machine 1 is the rotor of a pump that is driven via a drive shaft 2 and a differential gear system 3 from a prime mover 4. The prime mover 4 is preferably a medium-voltage three-phase machine that is connected to a grid 12 that in the illustrated example is a medium-voltage grid based on a medium-voltage three-phase machine. The chosen voltage level depends, however, on the application and mainly the power level of the prime mover 4 and can have any desired voltage level without influencing the basic function of the system according to the invention. According to the number of pole pairs of the prime mover 4, a design-specific operating speed range arises. Here, the operating speed range is that speed range in which the prime mover 4 can deliver a defined or desired or necessary torque and in the case of an electrical prime mover can be synchronized with the grid 12. A planetary carrier 7 is connected to the drive shaft 2, a prime mover 4 is connected to a ring gear 8, and a sun wheel 9 of the differential gear system 3 is connected to the differential drive 5. The heart of the differential system in this embodiment is thus a simple planetary gear stage with three inputs and outputs, one output being connected to the drive shaft 2 of the driven machine 1, a first input being connected to the prime mover 4, and a second input being connected to the differential drive 5.

In order to be able to optimally adapt the speed range of the differential drive 5, a matching gear system 10 is implemented between the sun wheel 9 and the differential drive 5. Alternatively to the illustrated spur wheel stage, the matching gear system 10 can, for example, also be made multi-stage or as a toothed belt or chain drive. Moreover, with the matching gear system 10, an axial offset for the differential drive 5 can be implemented that due to the coaxial arrangement of the driven machine 1 and the prime mover 4 makes possible a simple execution of the differential drive 5. A motor brake 13 that if necessary brakes the differential drive 5 is connected to the differential drive 5. Electrically, the differential drive 5 is linked to the grid 12 by means of a preferably low-voltage frequency converter consisting of a motor-side inverter 6a and a grid-side inverter 6b, and a transformer 11. The transformer equalizes any existing voltage differences between the grid 12 and the grid-side inverter 6b, and can be omitted at voltage equality between the prime mover 4, the grid-side inverter 6b, and the grid 12. The inverters 6a and 6b are connected by a d.c. intermediate circuit and if necessary can be separated locally, preferably the motor-side inverter 6a being positioned as near as possible at the differential drive 5. The major advantage of this concept is that the prime mover 4 can be linked directly, i.e., without complex power electronics, to a grid 12. The equalization between variable rotor speed and fixed speed of the grid-linked prime mover 4 is implemented by the variable-speed differential drive 5.

The torque equation for the differential system is:

$$\text{Torque}_{differential\ drive} = \text{Torque}_{drive\ shaft} * y/x,$$

the size factor y/x being a measure of the transmission ratios in the differential gear system 3 and in the matching gear system 10. The power of the differential drive 5 is essentially proportional to the product of the percentage deviation of the pump speed from its base speed x drive shaft output. Accordingly, a large speed range in principle requires a correspondingly large dimensioning of the differential drive 5. This is also the reason why differential systems are especially well suited for small speed ranges, but in principle any speed range is achievable.

A differential drive 5 for a pump as a driven machine 1, has, for example, a power of roughly 15% of the total system power. This in turn means that low speeds on the driven machine 1 cannot be implemented with the differential system. If the driven machine 1 must be brought from speed zero with high torque into its working speed range (this is the speed range in which the driven machine 1 essentially operates), this can only be implemented by the differential drive 5 being braked (either electrically or by means of a motor brake 13) and the prime mover 4 being switched to the grid. The driven machine 4 in turn can only apply the rated torque with difficulty from rest or it draws up to 7 times the rated current in order to accelerate roughly to synchronous speed.

By using a so-called star/delta connection, the starting current can be reduced, but thus also the attainable starting torque is reduced.

An improvement is achieved, for example, by the differential drive 5 at the beginning of starting being brought to its maximum possible operating speed. Due to external loads, in the meantime, the driven machine 1 remains in a region of low speed. In this way, the prime mover 4 is brought to a speed that is necessarily established depending on the speed of the driven machine 1, on the one hand, and the transmission ratio of the differential gear system 3 and a matching gear system 10 that may be present, on the other hand. Then, the differential drive 5 is adjusted such that its speed remains within its control speed range, while the prime mover 4 is switched to the grid 12 with or without a so-called star/delta connection. The speed control or braking of the differential drive 5 in this case takes place preferably electrically by the inverter 6a, 6b or by means of a motor brake 13.

The motor brake 13 can also be used to protect the differential drive 5 from overspeeds, when, for example, the prime mover 4 fails and the driven machine 1 stops or turns in the opposite direction.

Figure 2:
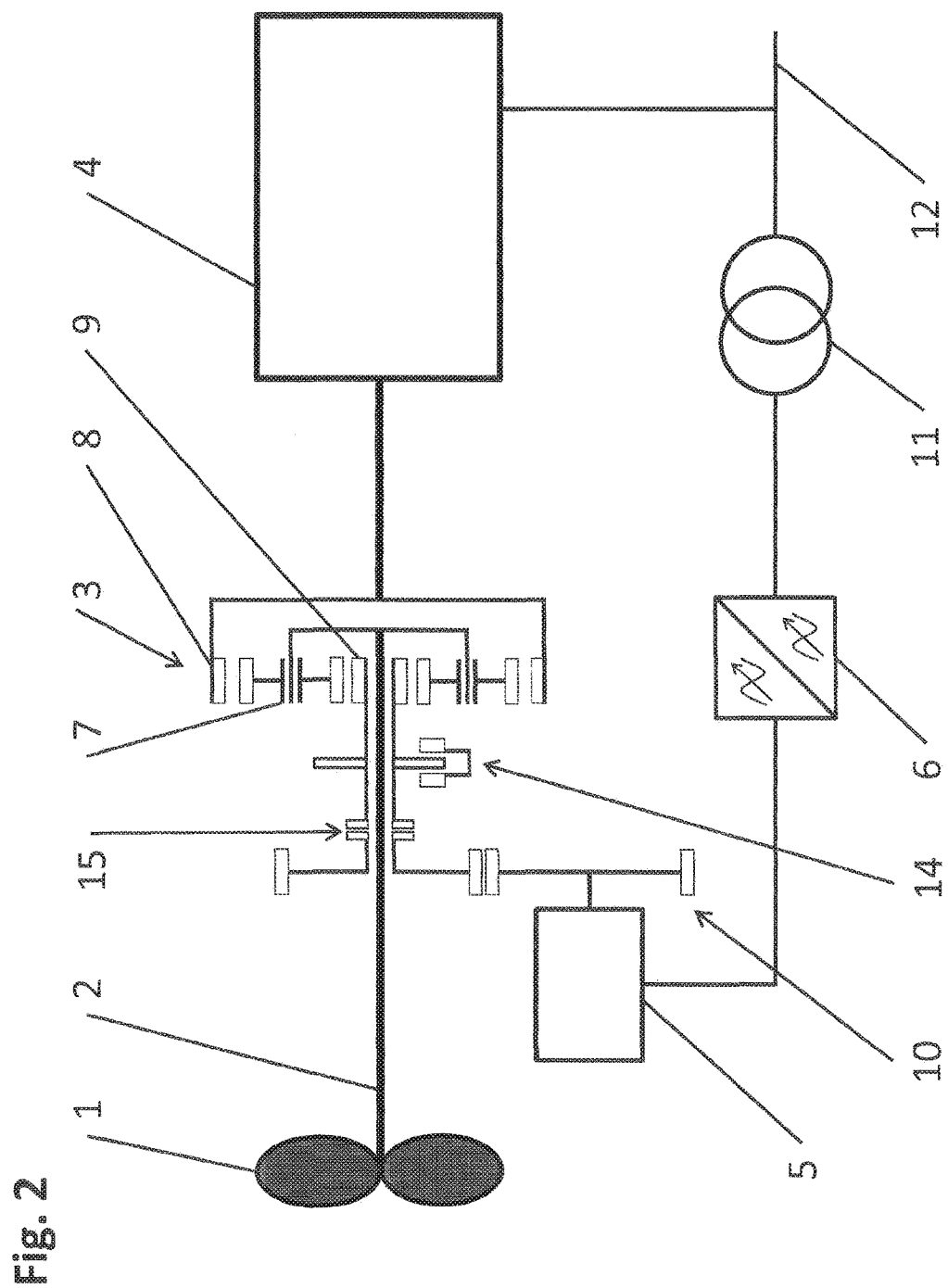
FIG. 2 shows another embodiment of a differential system.

FIG. 2 shows another embodiment of a differential system. Here, the illustrated drive train as in FIG. 1 also has a driven machine 1, a drive shaft 2, a differential gear system 3, a prime mover 4, and a differential drive 5 that is connected to the grid 12 by means of a frequency converter 6 (consisting of motor-side and grid-side inverters—here shown simplified as a unit) and a transformer 11. Here, the differential drive 5 is also linked to the differential gear system 3 by means of a matching gear system 10. In addition, however, a clutch 15 is implemented between the matching gear system 10 and the differential gear system 3.

A synchronization brake 14 acts on the sun wheel 9 and thus on the entire drive train. When starting, in a first step, the differential drive 5 and the matching gear system 10 are decoupled by the clutch 15 from the remainder of the drive train. If, at this point, the prime mover 4 is accelerated and connected to the grid, the sun wheel 9 turns freely at the same time, and noteworthy torque cannot build up in the entire drive train. Thus, in this case, the driven machine 1 remains in a region of low speed, and the prime mover 4 can be synchronized with the grid 12 without noteworthy external counter-torque.

In order to avoid the above-described effect of the high starting current when the prime mover 4 is being synchronized, either a star/delta connection can be implemented or the prime mover 4 can be brought to (approximately) synchronous speed by an auxiliary system—for example, a small variable-speed input—and then can be synchronized with the grid 12. Alternatively, with the clutch 15 engaged—as already described in FIG. 1—the prime mover 4 can be brought to speed with the differential drive 5. In doing so, the prime mover 4 cannot be accelerated to its synchronous speed, but at least the starting current that is being established is smaller. The clutch 15 is then disengaged again.

As soon as the prime mover 4 has been accelerated above a certain speed and the driven machine 1 in the meantime is turning only slowly, on the sun wheel 9, a speed is established that is high according to the transmission ratio of the differential gear system 3 and that (with consideration of the matching gear system 10) is above the allowed control speed range for the differential drive 5. The control speed range is the speed range in which the differential drive 5 works in order to be able to implement the working speed range of the driven machine 1. The control speed range is determined in doing so mainly by the voltage limits, current limits and speed limits that have been specified by the manufacturer. In this phase, the differential drive 5 cannot be connected to the grid 12. In another step, therefore, the second input of the differential gear system 3, which input is connected to the sun wheel 9, is decelerated with the synchronization brake 14 to a speed that is in the control speed range of the differential drive 5. Subsequently, the differential drive-side part of the clutch 15 is preferably synchronized (preferably by means of the differential drive 5) with the speed of the second input of the differential gear system 3, and then the clutch 15 is engaged. The clutch 15 is preferably a positive jaw clutch or a non-positive multiple-disk clutch. One advantage of the non-positive multiple-disk clutch is that if designed for this purpose, synchronization of the two clutch halves is not necessary.

By actuating the synchronization brake 14, the drive shaft 2 is necessarily accelerated, the torque available for this purpose being determined by the minimum from the braking force of the synchronization brake 14 acting on the drive shaft 2, on the one hand, and the breakdown torque of the prime mover 4, on the other hand. That is to say, in contrast to the starting options according to the prior art, here, the multiple rated torque can be implemented as the starting torque away from speed zero since the typical breakdown torque of a three-phase machine is roughly 2 to 3 times its rated torque. In principle, this starting method can also be used in, for example, internal combustion engines; this is necessary, among others, because in the partial speed range, the latter can only produce a torque that is much smaller than their rated torque.

The synchronization brake 14 can be, for example, a disk brake (=mechanical brake), with which it can also be used as an operating and safety brake for the differential drive 5. Thus, the synchronization brake 14 can in principle also perform the function of the motor brake 13 that is shown in FIG. 1.

Alternatively, however, any type of brake can be used. In particular, so-called retarders are suggested here. First of all, the group of hydrodynamic retarders (=hydraulic brake) should be named here. Hydrodynamic retarders generally work with oil or water that if necessary is routed into a converter housing. The converter housing consists of two rotationally-symmetrical blade wheels that are opposite one another, and prior to this, a rotor that is connected to the drive train of the system, and a stationary stator. The rotor accelerates the supplied oil, and the centrifugal force presses it to the outside. The shape of the rotor blades routes the oil into the stator that in this way induces a braking torque in the rotor and subsequently then also brakes the entire drive train. In an electrodynamic retarder (=electrical brake), for example an eddy-current brake, for example two steel disks (rotors) that are not magnetized are connected to the drive train. In between is the stator with electrical coils. When current is applied by activation of the retarder, magnetic fields are generated that are closed by the rotors. The magnetic fields in opposite directions then produce a braking action. The heat that is produced is released again by, for example, internally-ventilated rotor disks.

An important advantage of a retarder as an operating brake is its freedom from wear and tear and ease of control.

The system can also be used to operate the prime mover 4 in phase-shifting operation. That is to say, the prime mover 4 can deliver or draw reactive current into or out of the grid 12 without the driven machine 1 being operated. This applies in particular to power plants.

Figure 3:
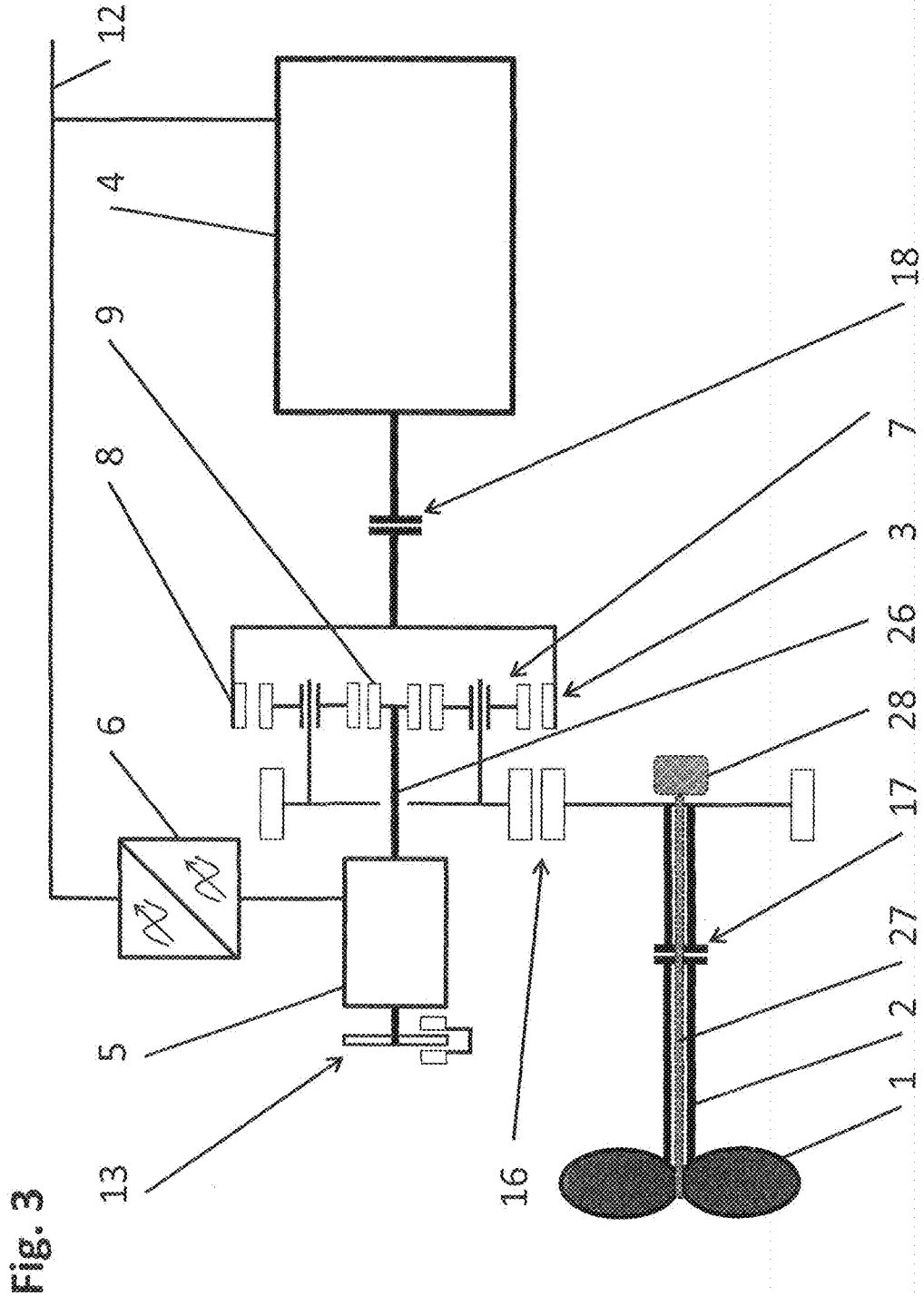
FIG. 3 shows another embodiment of a differential system with a gear driving stage.

FIG. 3 shows another embodiment of a differential system with a gear driving stage 16. This gear driving stage 16 makes it possible to match the speed range for the drive shaft 2 or for the driven machine 1 accordingly to the transmission ratio of the gear driving stage 16. The use of a gear driving stage 16 is necessary and advantageous when the speed level that results based on the technical parameters of a, for example, economical prime mover 4 and of an efficient differential system does not correspond to the required working speed range of a driven machine 1. A resulting advantage is that if the gear driving stage 16 as shown is a spur gear stage, the differential drive 5 can be positioned without a matching gear system 10 according to FIGS. 1 and 2 coaxially to the prime mover 4 on the side of the differential gear system 3 facing away from the prime mover. In order to achieve a possibly necessary higher transmission ratio in the differential gear system 3 in this way, so-called stepped planets can be used instead of simple planets. These stepped planets each consist of two gear wheels that are connected torsionally strong with a different diameter and preferably different toothing geometry. The internal gear 8 then engages the smaller-diameter gear wheel of the stepped planet, and the sun wheel 9 engages the second gear wheel of the stepped planet. The connecting shaft 26 between the differential gear system 3 and the differential drive 5 is preferably an electrically nonconductive fiber composite shaft. If the connecting shaft 26 is an electrically conductive shaft, preferably an insulating element can then be installed between the differential gear system 3 (or, if present, the matching gear system 10) and the differential drive 5 in order to keep unwanted electrical currents away from the differential gear system 3.

Thus, the differential system consists of a number of components that is as small as possible and, moreover, has an optimum overall efficiency. The motor brake 13 in the illustrated configuration also performs the function of the synchronization brake 14 from FIG. 2. The disadvantage of this embodiment compared to the one according to FIG. 2 is that the differential drive 5 must be designed for the starting process for a higher speed, the differential drive 5 at speeds above the control speed range preferably being separated from the grid. Thus, speeds outside of the control speed range need be only mechanically tolerated. In addition, to make matters worse, the transmission ratio of the differential gear system 3 must be higher than for the design according to FIG. 2, because here the matching gear system 10 is absent. In principle, however, the additional use of a matching gear system 10 is also possible for the variant according to FIG. 3, as a result of which the transmission ratio of the differential gear system 3 can be smaller. Moreover, a clutch 15 and a synchronization brake 14 can also be implemented between the second input of the differential gear system 3 or sun wheel 9 and the differential drive 5.

In principle, this embodiment can also be used for power plants, especially wind power plants, as the driven machine 1. In this case, compared to, for example, a pump as the driven machine 1, the power flow direction revolves, and the prime mover 4 works as a generator. If necessary, there can be one or more further gear stages between the gear driving stage 16 and the driven machine 1, which gear stages are then preferably made as a planetary gear stage.

Another advantage of this embodiment with gear driving stage 16 is that a coaxial hollow shaft 27 to the driven machine 1 can be easily implemented. By means of this hollow shaft 27, the turning driven machine 1 can be easily supplied electrically or hydraulically. Here, preferably rotational transmission 28 to the side of the gear driving stage facing away from the driven machine is applied. In principle, a mechanical rod can also be routed in the bushing 27 and thus by translational or rotary motion, for example, the blades of a pump rotor can be mechanically adjusted.

If the differential system and the gear driving stage 16 are provided as so-called "stand-alone" variants, the drive shaft 2 and the prime mover 4 are preferably connected by means of a clutch 17, 18.

Figure 4:
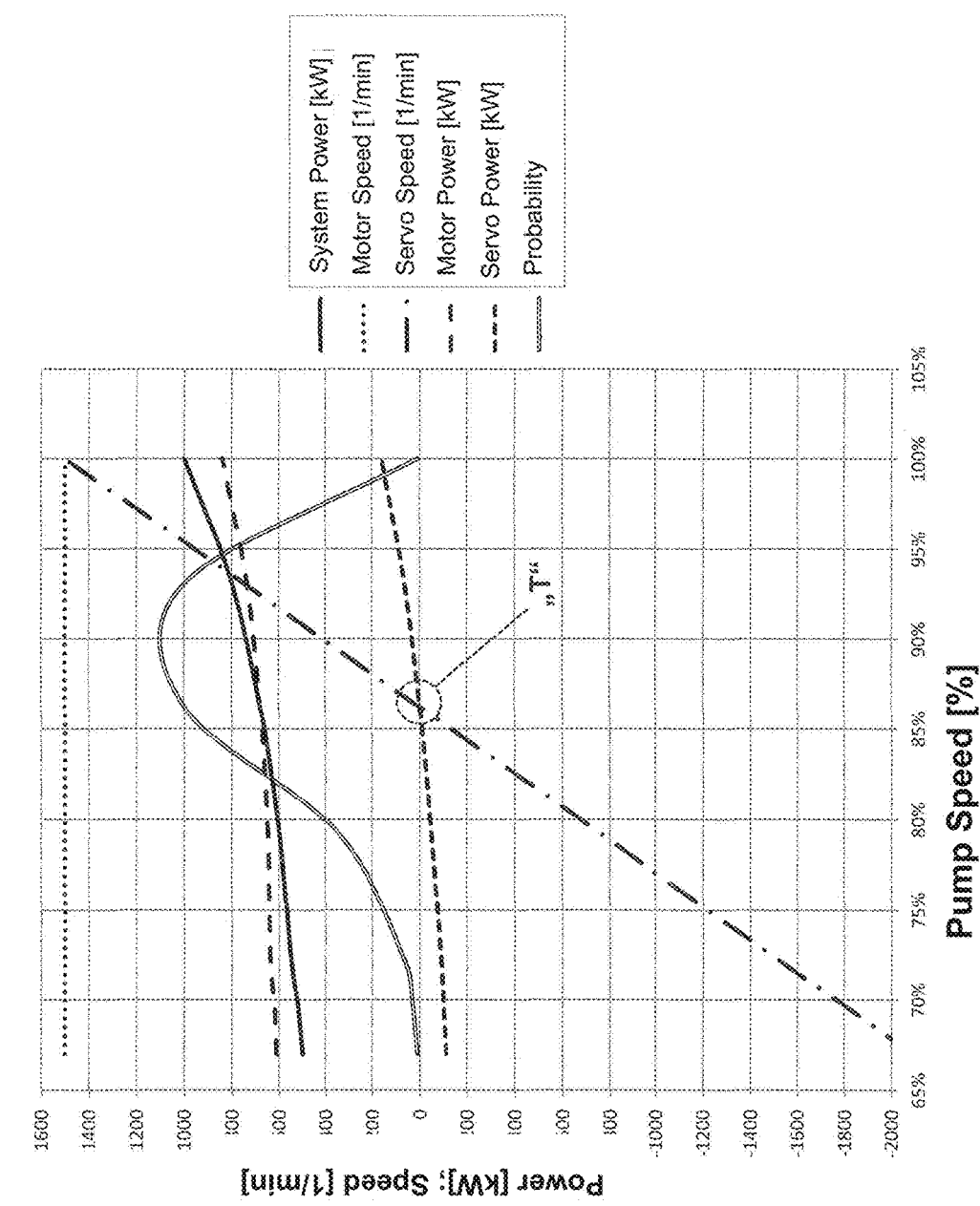
FIG. 4 shows the speed parameters and power parameters of a differential system of a pump.

FIG. 4 shows the parameters of speed and power of a differential system, for example for a pump. The figure shows power and speed values for a pump as a driven machine 1, a prime mover 4, and a differential drive 5, each plotted over the speed values of the drive shaft 2 ("pump speed"). The prime mover 4 is connected to the grid 12 and thus its speed ("motor speed") is constant—in the illustrated example roughly 1,500 l/min for a four-pole three-phase machine in a 50-Hz grid. The working speed range for the drive shaft 2 ranges from 68% to 100%, 100% being the chosen rated or maximum working point. According to the transmission ratio of the differential system, the speed of the differential drive 5 ("servo speed") ranges from −2,000 l/min to 1,500 l/min. This means that the differential drive 5 is operated by generator (−) and motor (+). Since the maximum required power of the differential drive 5 in the generator (−) region (roughly 110 kW) is smaller than that in the motor (+) region (roughly 160 kW), the differential drive 5 in the generator (−) region can be operated in the so-called field weakening region, with which for the differential drive 5, a higher speed—but with reduced torque—can be implemented. Thus, the speed range for the driven machine 1 can be easily expanded.

Another possibility for expanding the speed range for the driven machine 1 is the so-called 87-Hz characteristic for the operation of the frequency converter 6. The principle here is the following: motors can typically be operated in star (400 V) or delta (230 V). If a motor is operated as usual with 400 V in a star connection, then the rated working point is reached at 50 Hz. This characteristic is set in the frequency converter. A motor can also be operated with 400 V in a delta connection, however, and the frequency converter can be parameterized such that it reaches 50 Hz at 230 V. In this way, the frequency converter reaches its rated voltage (400 V) only at 87 Hz ($\sqrt{3} \times 50$ Hz). Since the motor torque is constant up to the rated working point, a higher power is achieved with the 87-Hz characteristic. Here, however, it should be watched that compared to the star connection, in the delta connection, the current is higher by $\sqrt{3}$. That is to say, the frequency converter must be dimensioned to be stronger. Moreover, in the motor, due to the higher frequency, even higher losses arise for which the motor must be thermally designed. Ultimately, however, with the 87-Hz characteristic, a correspondingly ($\sqrt{3}$) higher speed range is attained with—in contrast to field weakening—a torque that is not reduced.

The "T" point in FIG. 4 marks the so-called "base speed" of the drive shaft 2, at which the speed of the differential drive 5 is equal to zero. Ideally, this "T" point is placed in a working range in which the system is operated over large time intervals. At this operating point, the motor brake 13 can be activated, with which the differential drive 5 need not be operated and subsequently associated losses and wear and tear are avoided. In the motor (+) region of the family of characteristics, the input is driven in parallel from the prime mover 4 and the differential drive 5. The sum of the two powers is the input power for the drive shaft 2 ("system power")—minus the system losses that arise. In the generator (−) region, the prime mover 4 must compensate for the power of the differential drive 5 ("servo power"), as a result of which the overall system power ("system power") is the input power of the prime mover 4 ("motor power") minus the power of the differential drive 5. That is to say, in terms of efficiency, the motor (+) region is better. This matches extremely well the illustrated exemplary frequency distribution ("probability") of the load distribution in continuous operation of the system that shows a large part of the duration of operation in the motor (+) region. As dictated by service, however, operation at lower pump speeds is also necessary, here the proportional dwell time diminishing strongly with decreasing pump speed.

In principle, it can be established that the closer the pump speed ("pump speed") is to the base speed "T," the smaller the power flow via the differential drive 5, and thus the overall system efficiency is also very high. Since, with increasing pump speed, the required input power also rises, however, compared to an input according to the state of the art, the required size of the prime mover 4 can be reduced by the size of the differential drive 5 by the parallel driving of the prime mover 4 and of the differential drive 5.

As was already mentioned initially, according to German Utility Model No. 20 2012 101 708.3, the transmission ratio of the differential drive can be fixed at 1 using a differential blocking device. Thus, it is possible with the differential drive 5 to accelerate the complete drive train to the synchronous speed of the prime mover 4 and then to synchronize the latter with the grid. Subsequently, the differential drive 5 can be alternately switched off, and the prime mover 4 drives the driven machine 1 with the synchronous speed alone. In addition, the differential drive 5 can drive the driven machine 1 parallel to the prime mover 4, with which a higher overall drive train power can be implemented. Thus, two steady-state operating points of the drive train can be implemented with the differential blocking device and the motor brake 13. In one especially economical version, the differential drive is made lower-power such that with it, only the prime mover 4 is synchronized with the grid 12, or the differential blocking device. This can alternatively also be accomplished, however, by optional driving of the output or of the first input of the differential gear system 3.

Figure 5:
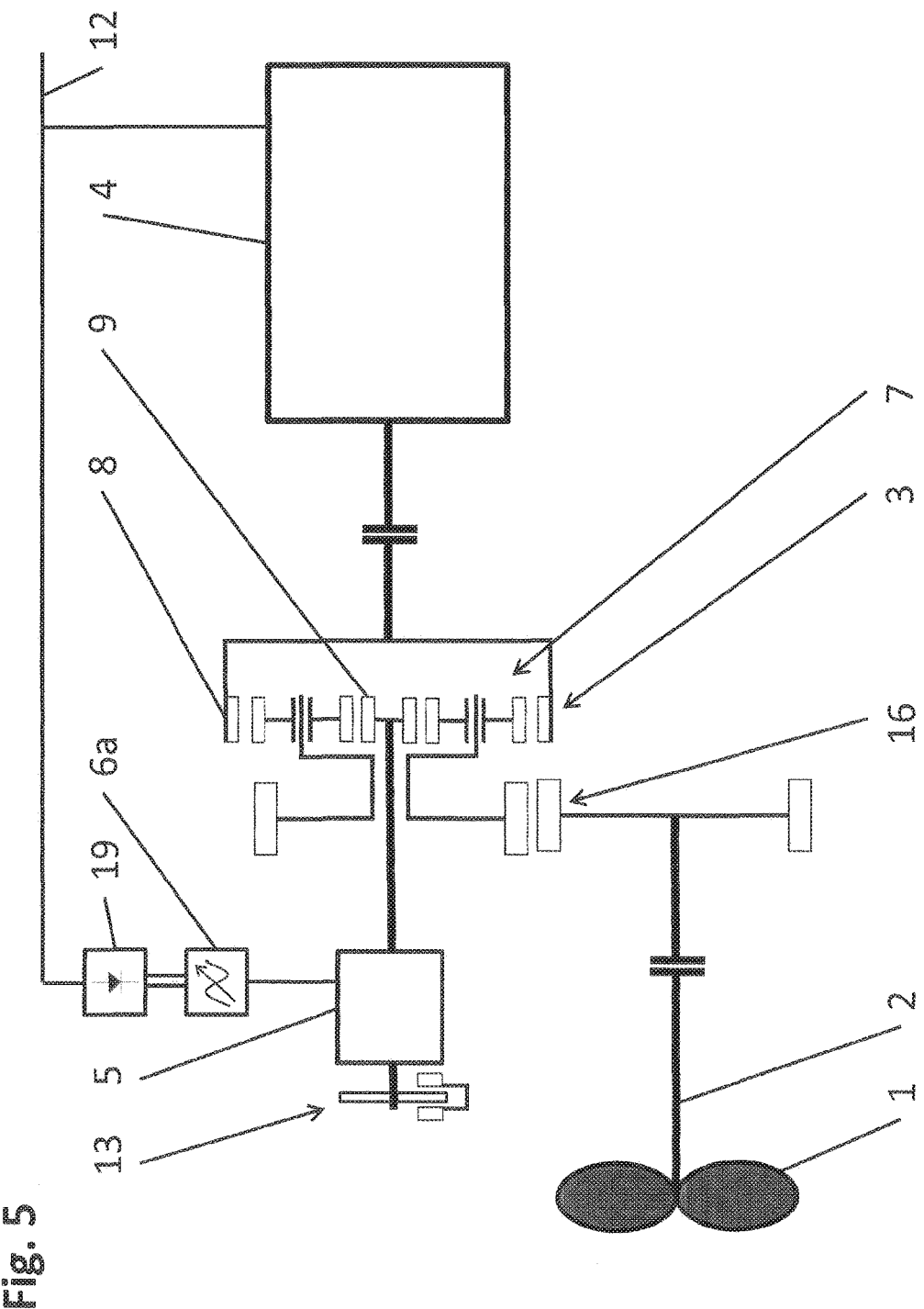
FIG. 5 shows another embodiment of a differential system with a simplified differential drive.

FIG. 5 shows another embodiment of a differential system with a simplified differential drive. In this variant embodiment, the grid-side inverter 6b is replaced by a simple rectifier 19. The latter has a generally higher efficiency than an inverter 6b and is also much more durable and economical. The sole limitation by the use of a rectifier 19 is that the differential drive 5 can only continue to be operated by motor (+).

If, in the reverse case, the differential system is operated only by generator (−), the motor-side inverter 6a can be replaced by a rectifier 19 while maintaining the grid-side inverter 6b.

Figure 6:
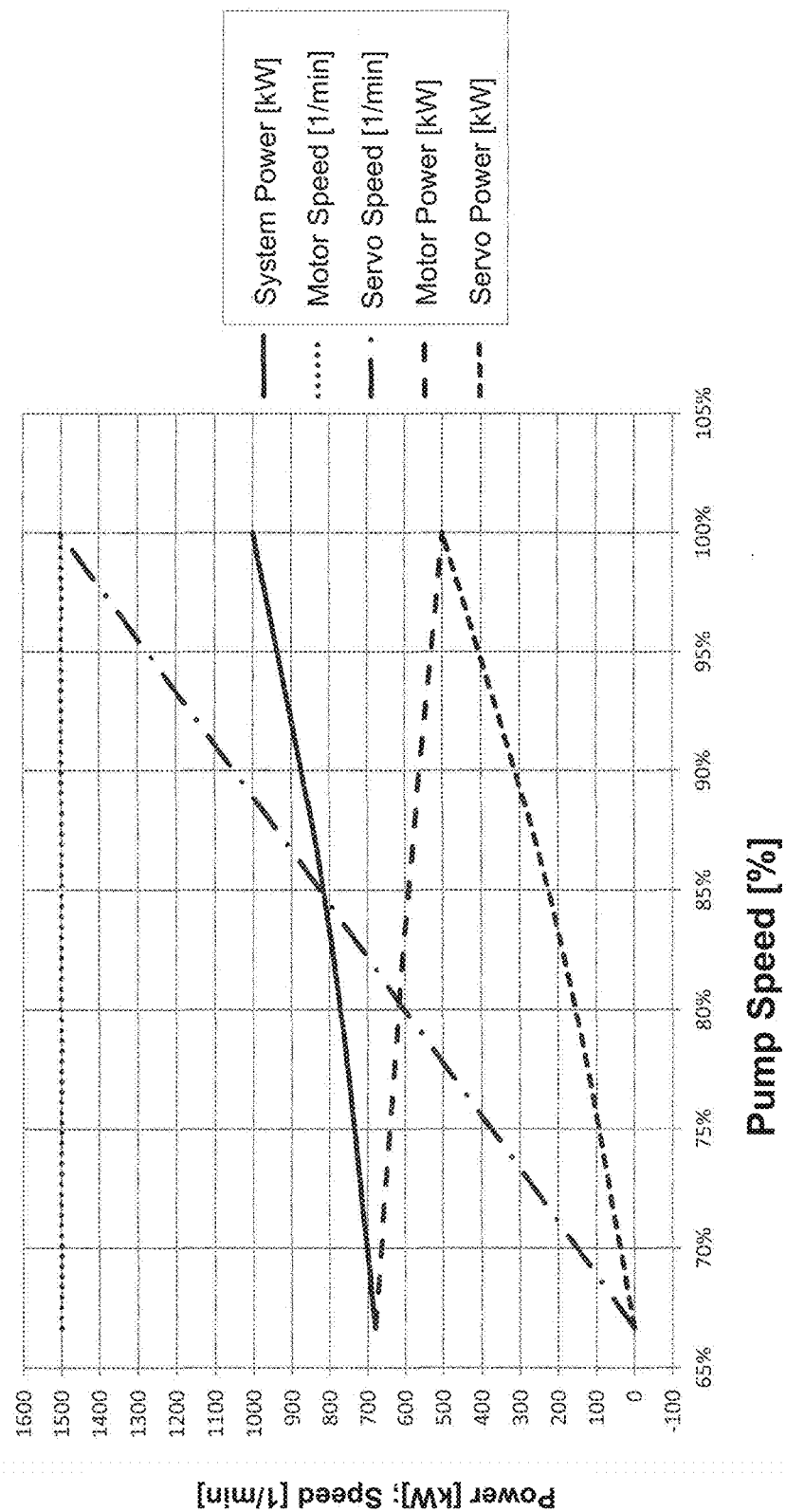
FIG. 6 shows the speed parameters and power parameters following from FIG. 5.

FIG. 6 shows the parameters of speed and power following from FIG. 5 at the same working speed for the drive shaft 2 as in FIG. 4 (68%-100%). Due to the fact that the differential drive 5 continues only to be operated in the motor (+) region, the maximum power flow via the differential drive 5 is much greater than in the example shown above. At the rated working point, the required power of the differential drive 5 ("servo power") reaches roughly 500 kW, that is, 50% of the total drive power ("system power"). This results in that the frequency converter 6a, 19 must also be dimensioned to be accordingly large. The advantage of this variant is that the transmission ratio of the differential gearing system 3 can be much smaller than for the variant according to FIG. 3, and thus when the system starts, the speed of the differential drive 5 that is the maximum that can be attained in doing so is smaller.

Figure 7:
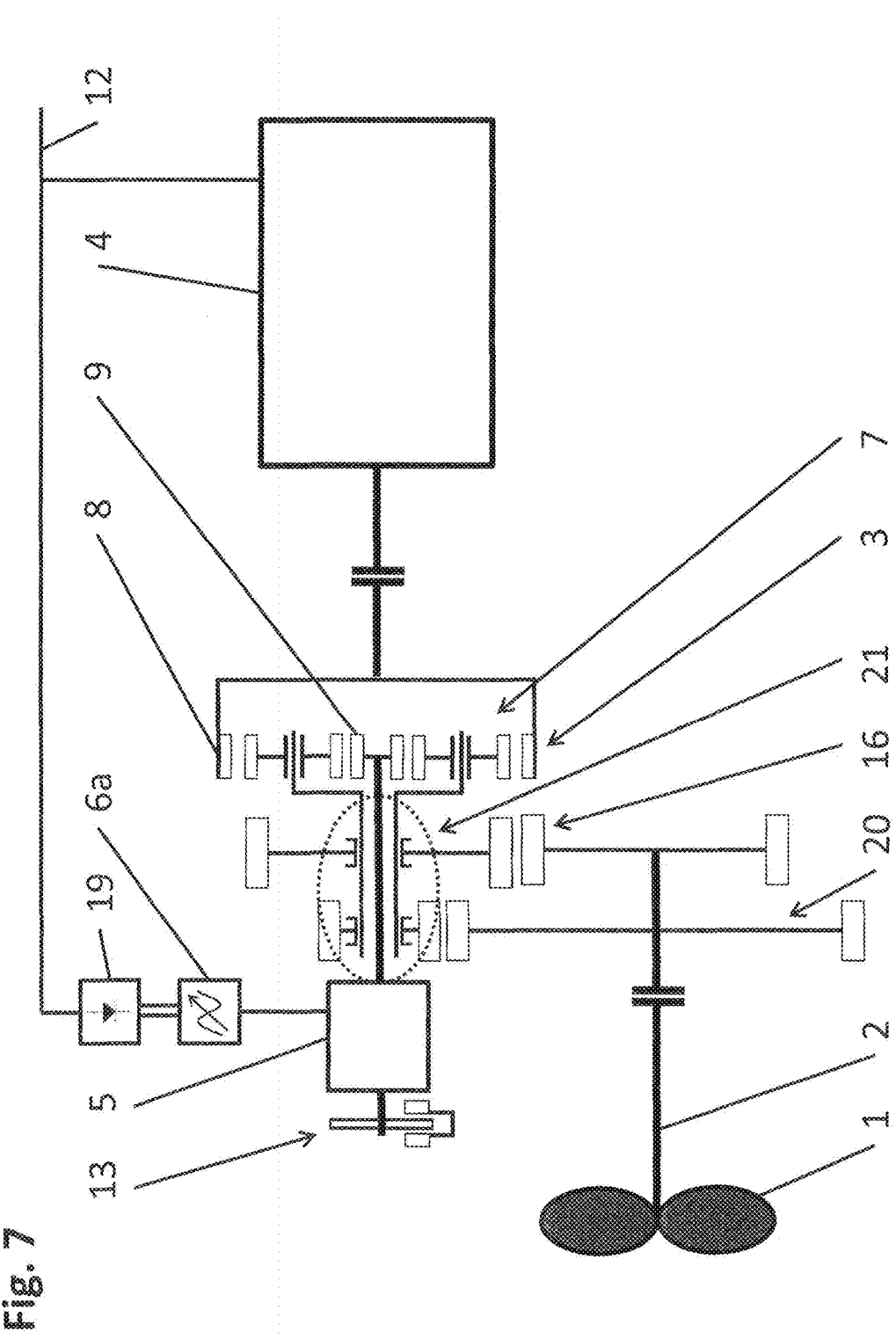
FIG. 7 shows another embodiment of a differential system with a gear shifting stage.

FIG. 7 shows another embodiment of a differential system with a gear shifting stage. In the illustrated embodiment, the gear driving stage 16 is expanded by another gear driving stage 20 with a transmission ratio that is different from the gear driving stage 16. By means of a shifting device 21, it is possible to choose between the two gear driving stages, and thus an adjustable gear system 16, 20, 21 is obtained that can implement two speed ranges for the drive shaft 2. Alternatively, several shifting stages can also be implemented.

Figure 8:
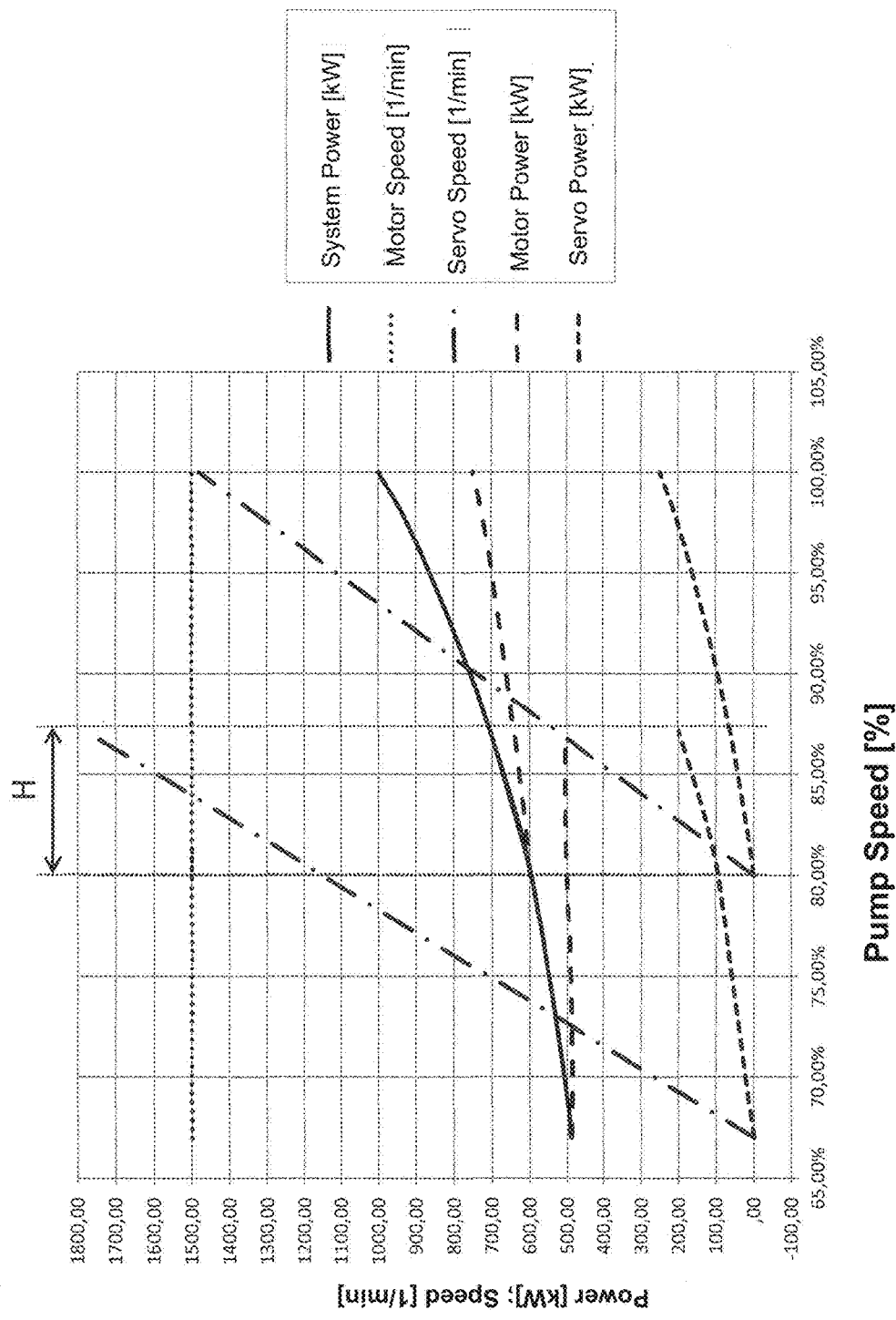
FIG. 8 shows the speed parameters and power parameters following from FIG. 7.

FIG. 8 shows the parameters of speed and power that follow from FIG. 7. In principle, the figure contains two families of characteristics—each of which is similar to FIG. 6, but each with a smaller working speed range for the driven machine 1. These families of characteristics are offset to one another by the two-stage adjustable gear system 16, 20, 21 with which at the same overall working speed range for the pump ("pump speed" 68%-100%), a size for the differential drive 5 that is smaller in comparison to FIG. 6 is necessary. Moreover, in the family of characteristics with smaller system power, the differential drive 5 can be operated in the field weakening range, since here, the torque that is necessary for the differential system is in principle smaller than its rated torque. Thus, the working speed range in the family of characteristics with the smaller system power is larger than that for the second family of characteristics. The two families of characteristics overlap one another preferably in the hysteresis region "H" in order to avoid frequent shifting between the families of characteristics. The hysteresis region "H," however, burdens a differential system that is still smaller in terms of power, and if no overlapping of the two families of characteristics is necessary, it can also be smaller or can be omitted entirely.

Figure 9:
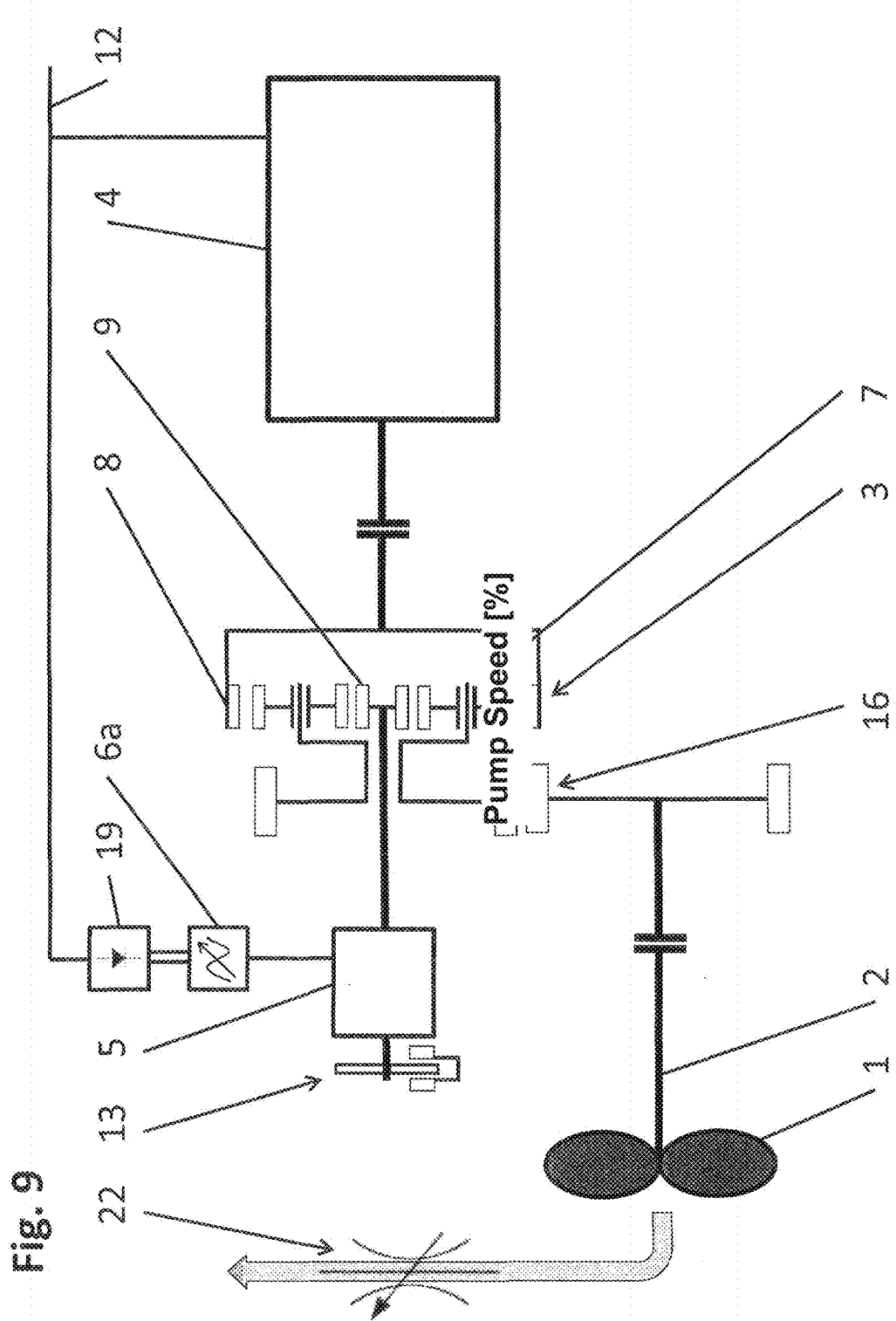
FIG. 9 shows another embodiment of a differential system with a reduced speed range.

FIG. 9 shows one embodiment of a differential system according to the invention with a reduced speed range. In principle, the drive train is built the same as already shown in FIG. 5. In the power system 29 of the driven machine 1 (for example, a pump, a compressor, or a fan), a choke 22 is integrated following it. Thus, the amount delivered by the driven machine 1 can be choked without for this purpose reducing the speed of the driven machine 1. This choke 22 is conventionally used in drives that are not variable-speed drives in order to adjust/control the delivered amount. The choke 22 can have the most varied embodiments, a simple flap constituting a conventional variant.

In principle, for the variant according to FIG. 9, the additional use of a matching gear system 10 is also possible. Moreover, a clutch 15 and a synchronization brake 14 can also be implemented between the second input or the sun wheel 9 and the differential drive 5. Furthermore, the gear driving stage 16 is also not critically necessary.

In order to make the size of the differential drive 5 and of the frequency converter 6a, 19 as small as possible, instead of the rectifier 19, a grid inverter 6b can also be used, and thus the system can be operated by motor (+) and generator (−), as a result of which the size of the differential drive 5 is decisively reduced. Thus, the base speed ("T" point) moves into the middle of the working speed range, in which the differential drive 5 can be braked, and thus the differential system can be especially efficiently operated. Small variations of the amounts delivered (such as, for example, in pumps) or variations that are necessary based on operation can be adjusted/compensated here with the choke 22.

One possibility for expanding the working speed range for the driven machine 1 is offered, as already described for FIG. 4, by the field weakening region or the so-called 87-Hz characteristic for the operation of the differential drive 5 and of the frequency converter 6a, 6b or 19.

Figure 10:
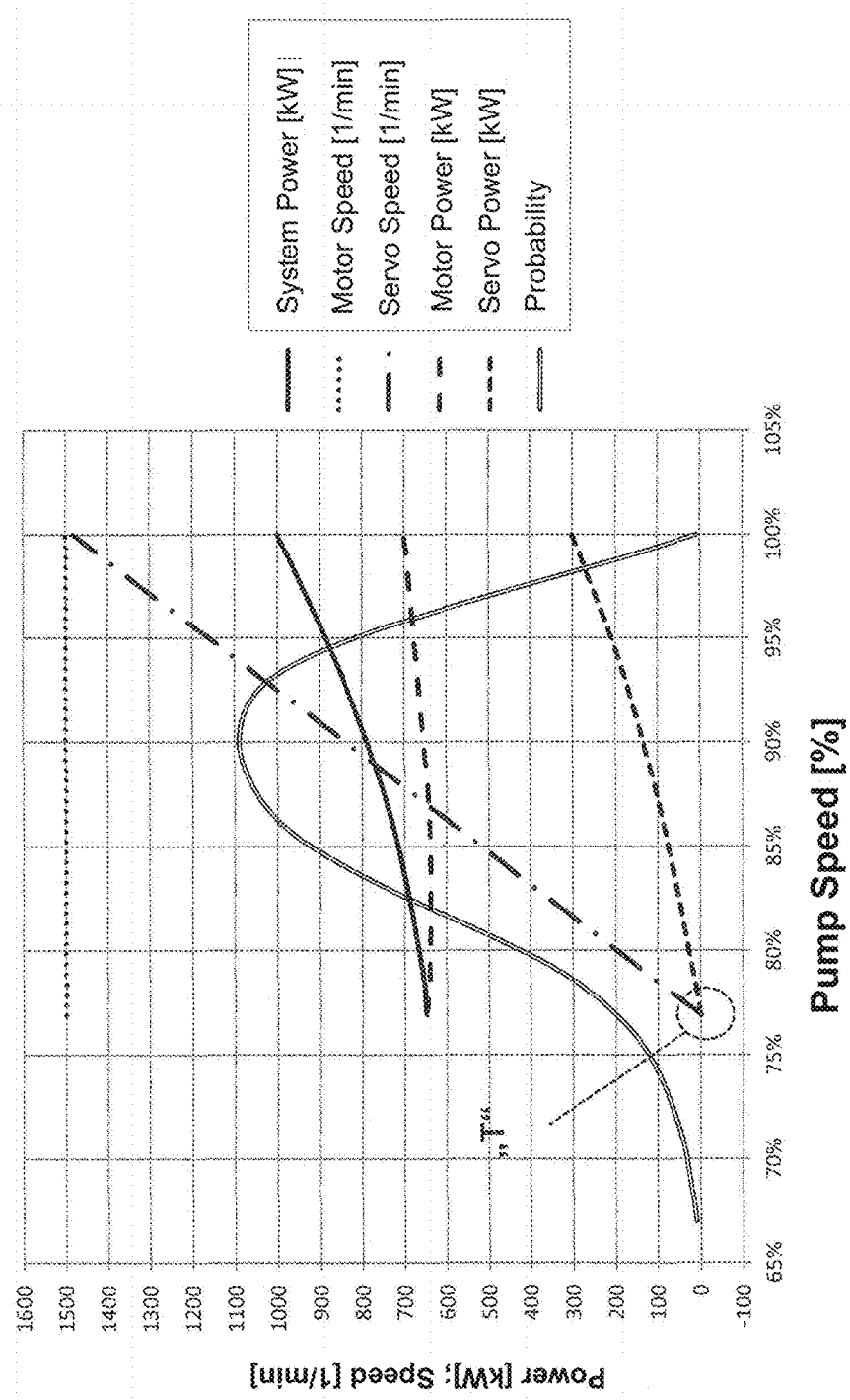
FIG. 10 shows the speed parameters and power parameters following from FIG. 9.

FIG. 10 shows the parameters of speed and power that follow from FIG. 9. The chosen operating range of the differential system thus moves into a region with a high operating frequency distribution ("probability"). As soon as the differential drive 5 reaches the base speed ("T" point) as the pump speed decreases, it is preferably braked or stopped.

A smaller delivery rate that is necessary for reasons of operating technology is implemented by activation (adjustment/control) of the choke 22. The speeds of the differential system remain essentially constant here.

Figure 11:
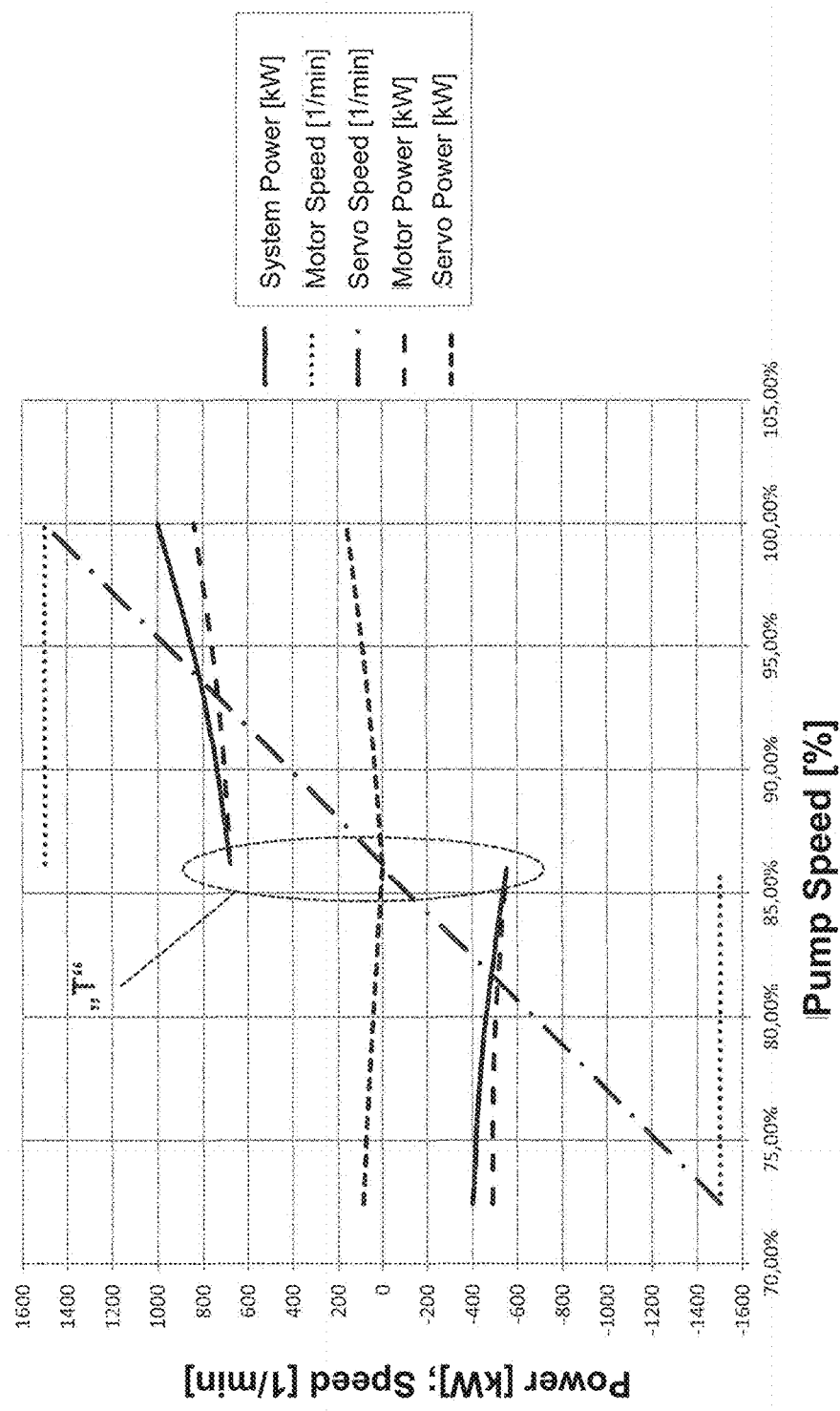
FIG. 11 shows the possible speed parameters and power parameters resulting from FIG. 9 for a so-called pump turbine.

FIG. 11 shows the possible parameters of speed and power for a so-called pump turbine that follow from FIG. 9 (a choke 22 can be omitted here). In this application, the system is preferably operated by motor (+) above the base speed ("T" point) and by generator (−) below the base speed. Here, in generator operation, the prime mover 4 works as a generator that is connected to the grid 12. The differential drive (5) remains operated by motor (+) at a driven machine speed below the base speed due to the power flow reversal. This yields an electrically simple system that can be implemented without a grid-side inverter. Since, however, the power flows from the generator (4) and the differential drive (5) are opposite below the base speed and thus the system efficiency is poorer than in purely motor operation—if possible in terms of operating technology—a fixed speed, i.e., preferably with the differential drive 5 stopped, can be used entirely or partially in this mode. Ideally, the working points are then placed such that the pump turbine at the base speed ("T") has an optimum efficiency for the turbine operating mode.

Figure 12:
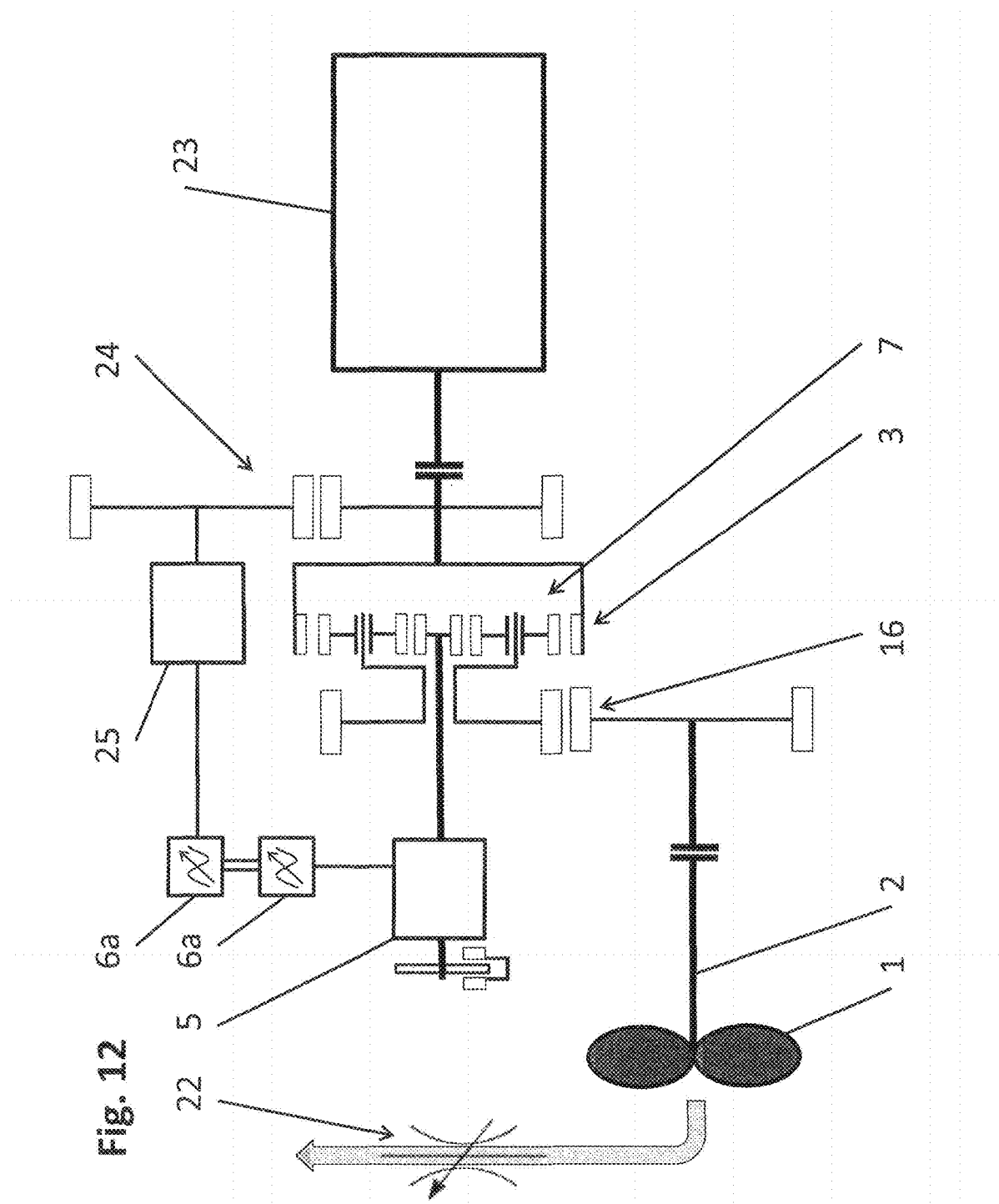
FIG. 12 shows another embodiment of a differential system for an internal combustion engine as a prime mover.

FIG. 12 shows another embodiment of a differential system for an internal combustion engine 23 as the prime mover. Since the internal combustion engine 23 is not connected to an electrical grid, the required energy for the differential drive 5 is taken from the first input of the differential gearing system 3 or is supplied to it. Here, two motor-side inverters 6a are connected by means of a d.c. intermediate circuit and drive another differential drive 25. The latter is connected to the first input of the differential gearing system 3 by means of the matching gear system 24. The matching gear system 24 that is shown as single-stage can also be multi-stage if necessary. Thus, the energy circuit is closed, and the system can be operated by both generator (−) and also motor (+), more or less independently of the grid. If the design speeds of the internal combustion engine 23 and of the differential drive 25 go well together, the matching gear system 24 can be omitted, and the differential drive 25 is directly (by means of a clutch) coupled to the internal combustion engine 23.

Ideally, the electrical part of the differential system consisting of the differential drives 5 and 25 and the two inverters 6a is also connected to a grid. Thus, for example, the starting scenarios that are described for FIGS. 1 to 3 can be easily implemented and/or (as is conventional, for example, in ship propulsions) a power grid can be supplied. Moreover, the integration of a shifting stage according to FIG. 7 is also possible.

Instead of the differential drives 5 and 25 and the two inverters 6a, a hydrostatic actuating gear can also be used. In doing so, the differential drives 5 and 25 are replaced by a hydrostatic pump/motor combination, which is connected to a pressure line and which both can preferably be adjusted in flow volume. Thus, as in the case of a variable-speed electrical differential drive, the speeds can be controlled. This also applies to applications with an electrical machine as the prime mover (4).

The major advantages that arise for the operation of an internal combustion engine 23 in combination with a differential system are, on the one hand, the attainable high starting torque and the fact that the internal combustion engine can be run in an efficiency-optimum range as soon as the differential system takes over speed matching for the driven machine 1. Because, in contrast to a grid-coupled three-phase machine, an internal combustion engine can be operated at variable speed, the range of possibilities for expanding/varying the families of characteristics of the system is wide.

FIG. 13 shows a control system for damping drive train vibrations. The torque on the differential drive 5 is proportional to the torque in the entire drive train, as a result of which torque adjustment/control and also drive train damping by the differential drive 5 become possible. Drive train damping is defined here as the dedicated correction of rotational drive train vibrations (driven machine 1, drive shaft 2, differential gear system 3, prime mover 4, and differential drive 5) that can occur transiently or constantly and that lead to unwanted loads in the entire drive train or in parts of it. This is achieved by modulation of the torque and/or of the speed of the differential drive 5 with vibrations of the same frequency.

Such unwanted drive train vibrations or transient drive train loads can arise either by loads acting from the outside on the driven machine 1, in the drive shaft 2, the differential gear system 3, and the differential drive 5 themselves or by the prime mover 4 and are typically apparent in the speed behavior or torque behavior of the drive train.

Preferably, they can be detected by measurements of speed and/or vibration in the drive train or by current measurements on the prime mover 4 and/or on the differential drive 5. Direct detection of torques is likewise possible, but in general can only be implemented with complexity. The type of detection, however, always depends ultimately on at which location in the drive train the damping is to take place or whether couplings can be used.

If drive train vibrations are caused by, for example, a typical operating behavior on the driven machine 1, and if they are to be compensated in their action on the prime mover 4, they can be reduced or extinguished by impressing torque-vibrations in phase opposition on the differential drive 5. This is the case, for example, in compressors in which design-specific vibration excitations that correlate strongly with the piston position occur when the piston rod is revolving. Since the respective vibration excitation always occurs at the same piston position, it is sufficient to know the peripheral position or rotary position, for example, by measurement in order to be able to compensate for this. The knowledge of this vibration excitation allows selective compensation of individual or multiple vibrations at the same time. This is preferably achieved by detecting the position of the piston rod or by one of the above-cited methods. The necessary synchronous torque/speed matching in phase opposition is implemented by conventional methods of signal processing preferably with oscillators and notch-filter algorithms that simulate and evaluate the measured vibration excitation with the correct frequencies. Incorporated into an oppositely-coupled system, the necessary amplitudes and phase angles are thus automatically established for the vibrations that have been generated for compensation and with which then the actuator on the differential drive 5 is activated.

As is shown by way of example in FIG. 13, a differential connection 30 is supplied with a constant speed $n_4$ of the prime mover that is to be achieved, on the one hand, and the speed $n_2$ of the drive shaft 2. A control system 31 controls the differential drive 5 using the desired speed $n_{5desired}$ that has been determined therefrom and from the actual speed $n_5$ of the input shaft of the differential drive 5 via the frequency converter 6 such that vibrations of the prime mover 4 are damped as well as possible or as desired. The drive train damping that is described with reference to FIG. 13 can also be used independently of all other embodiments that were described above.

The invention claimed is:

1. A method for operating a drive train with a drive shaft, an electrical prime mover that is connected to a power grid, and a differential gear system with three inputs and outputs, one output being connected to the drive shaft, a first input being connected to the prime mover, and a second input being connected to a differential drive, the method comprising:

only operating the differential drive as a motor, while the prime mover is operated as a motor and while the prime mover is operated as a generator.

2. The method according to claim 1, wherein a first stable-speed operating point is at a speed of the second input of zero.

3. The method according to claim 1, wherein a driven machine is connected to the drive shaft, and wherein a part of a working power of the driven machine is dissipated by a choke.

4. The method according to claim 1, wherein the differential drive is capable of being operated with an 87-Hz characteristic.

5. A drive train comprising:
a drive shaft;
an electrical prime mover that is connected to a power grid; and
a differential gear system with three inputs and outputs, one output being connected to the drive shaft, a first input being connected to the prime mover, and a second input being connected to an electrical differential drive, wherein the differential drive is connected to the power grid via a rectifier that is a grid-side inverter and installed such that the differential drive is only configured to be operated as a drive and not as a generator.

6. The drive train according to claim 5, wherein a driven machine that is driven by the drive train is one of a pump, a compressor, a fan, a mill, and a pump turbine.

7. The drive train according to claim 5, wherein the differential drive is a three-phase machine.

8. The drive train according to claim 5, wherein the differential drive is connected to the second input via a gear stage.

9. The drive train according to claim 5, further comprising an adjustable gear system between a driven machine and the differential gear system.

10. The drive train according to claim 5, wherein a driven machine is connected to the drive shaft, wherein the driven machine is a delivery system in a line system, and wherein a choke is located after the driven machine in the line system.

\* \* \* \* \*